United States Patent
Mikhailov et al.

(10) Patent No.: US 9,116,036 B2
(45) Date of Patent: Aug. 25, 2015

(54) OPTICAL POLARIMETER

(71) Applicant: OFS Fitel, LLC, Norcross, GA (US)

(72) Inventors: Vitaly Mikhailov, Oxford, NJ (US); Paul S Westbrook, Bridgewater, NJ (US)

(73) Assignee: OFS FITEL, LLC, Norcross, GA (US)

( * ) Notice: Subject to any disclaimer, the term of this patent is extended or adjusted under 35 U.S.C. 154(b) by 22 days.

(21) Appl. No.: 14/202,012

(22) Filed: Mar. 10, 2014

(65) Prior Publication Data

US 2014/0268278 A1 Sep. 18, 2014

Related U.S. Application Data

(60) Provisional application No. 61/798,153, filed on Mar. 15, 2013.

(51) Int. Cl.
*G01J 4/04* (2006.01)

(52) U.S. Cl.
CPC .......................................... *G01J 4/04* (2013.01)

(58) Field of Classification Search
CPC .................. G01J 4/00; G01J 4/02; G01J 4/04
See application file for complete search history.

(56) References Cited

U.S. PATENT DOCUMENTS

| 6,211,957 | B1 | 4/2001 | Erdogan et al. |
| 7,773,207 | B1 | 8/2010 | Boroditsky et al. |
| 2003/0118263 | A1* | 6/2003 | Phua et al. ...................... 385/11 |

OTHER PUBLICATIONS

Wang, et al., "A Complete Spectral Polarimeter Design for Lightwave Communication Systems", Journal of Lightwave Technology, vol. 24, No. 11, Nov. 2006, pp. 3982-3991.
Wang, et al., "Monitoring PMD-Induced Penalty and Other System Performance Metrics via a High-Speed Spectral Polarimeter", IEEE Photonics Technology Letters, vol. 18, No. 16, Aug. 15, 2006, pp. 1753-1755.

* cited by examiner

*Primary Examiner* — Joseph P Martinez
(74) *Attorney, Agent, or Firm* — Wendy W. Koba, Esq.

(57) ABSTRACT

A polarimeter is proposed that utilizes additional Stokes parameter measurements to determine both an average Stokes vector, as well as any rotation of the state of polarization around the Stokes vector. The optical polarimeter is configured to measure the state of polarization (SOP) under multiple, different conditions that yield both averaged Stokes vector and at least one other secondary (filtered) Stokes vector, the latter thus being determined from a subset of the conditions used to create the average Stokes vector. The secondary Stokes vector created from a filtered input will necessarily exhibit changes over time as a function of polarization transformations (based on filter-dependent changes), while the average Stokes vector will retain a constant value. Thus, a comparison of the average Stokes vector to the changing secondary Stokes vector allows for these polarization-dependent transformations to be recognized.

29 Claims, 8 Drawing Sheets

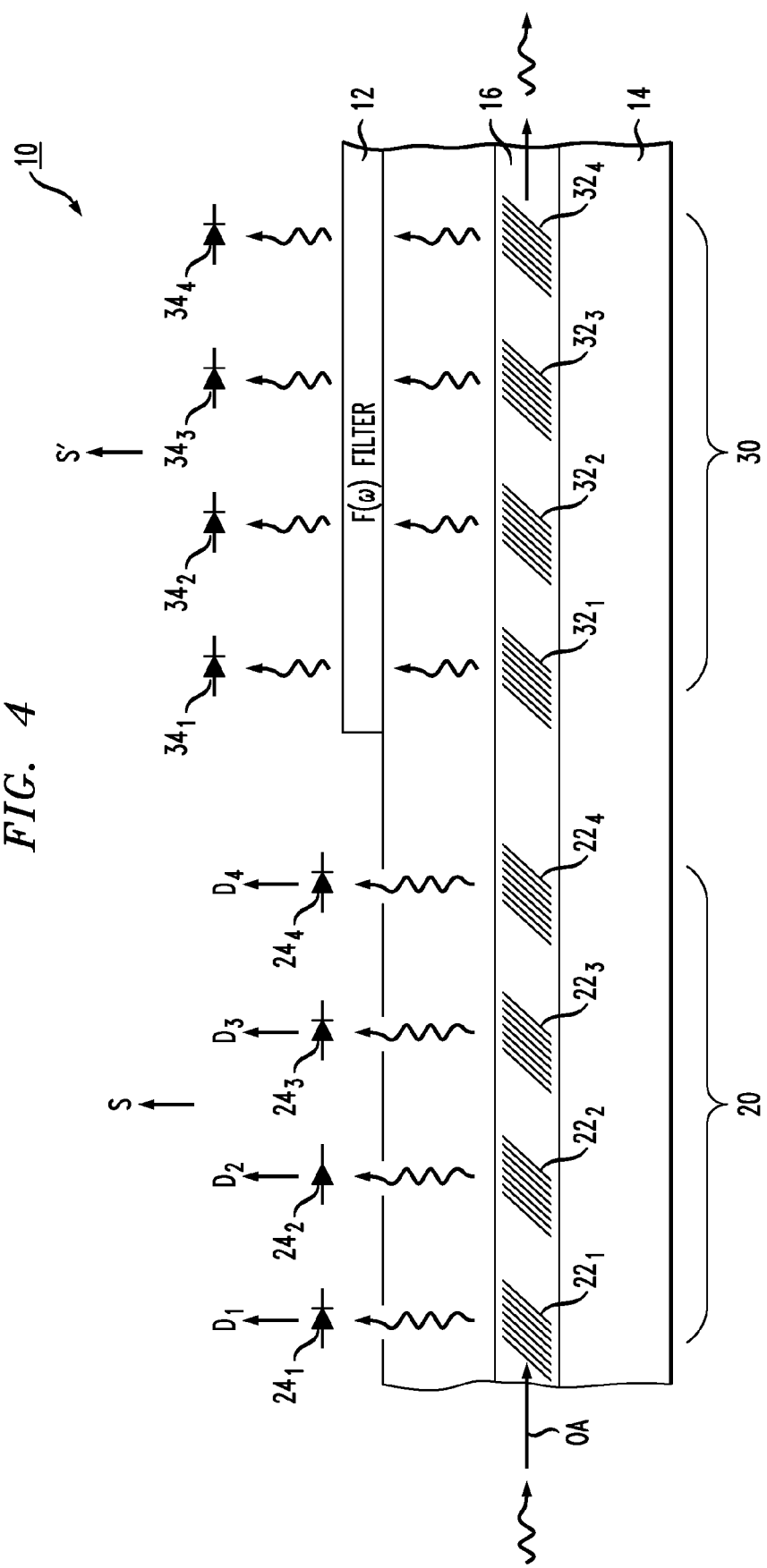

OPTICAL POLARIMETER

CROSS-REFERENCE TO RELATED APPLICATIONS

This application claims the benefit of U.S. Provisional Application Ser. No. 61/798,153, filed Mar. 15, 2013 and herein incorporated by reference.

TECHNICAL FIELD

The present invention relates to an optical polarimeter and, more particularly, to a polarimeter that is capable of measuring both an average Stokes vector as well as any rotation of the state of polarization around the Stokes vector.

BACKGROUND OF THE INVENTION

Polarimeters measure the state of polarization of an input optical signal. Measurement of light polarization and its variation in time is important for many photonic applications, including telecommunications and fiber sensors. The transfer properties of fiber-based optic devices such as isolators, couplers, amplifiers and the like depend on the polarization state in the fiber itself. Thus, to completely characterize these devices, the relationship between the input and output states of polarization (SOP) of the fiber-based system must be known.

A conventional method for measuring the SOP of a light beam includes aligning a waveplate and a linear polarizer in the optical path of the beam. The waveplate is rotatable about the optical axis and is typically a quarter-wave plate. An optical sensor, such as a photodetector, is positioned to measure the intensity of light transmitted by the waveplate and polarizer. In operation, the waveplate is sequentially rotated to a minimum of four angular positions about the optical axis relative to the linear polarizer, and the transmitted light intensity is measured at each position by the photodetector.

The art has led to the development of in-line fiber polarimeters that utilize a set of four solid-state detectors that absorb only a small, scattered portion of a propagating optical signal, allowing for the remainder of the signal to continue along and impinge each detector in turn. Each detector develops an electrical signal proportional to the polarization-dependent fraction of light that it absorbs from the fiber. The four electrical output signals are then used to determine the four Stokes parameters of light in the fiber via an instrument matrix determined by calibration (at times, referred to as a "calibration matrix").

The four Stokes parameters $S_0$, $S_1$, $S_2$ and $S_3$ (which combine to form the "Stokes vector") are generally defined as follows: $S_0$ is the total power, $S_1$ is the linearly-polarized horizontal component minus the linearly-polarized vertical component, $S_2$ is the linearly-polarized component at 45° minus the linearly-polarized component at −45°, and $S_3$ is the right-hand circularly polarized component minus the left-hand circularly polarized component. Thus, a 4×4 calibration matrix C can be developed to define the relationship between a set of four detector output signals $D_1$, $D_2$, $D_3$, $D_4$ and the four Stokes parameters $S_0$, $S_1$, $S_2$, $S_3$:

$$\begin{bmatrix} S_0 \\ S_1 \\ S_2 \\ S_3 \end{bmatrix} = \begin{bmatrix} C_{00} & C_{01} & C_{02} & C_{03} \\ C_{10} & C_{11} & C_{12} & C_{13} \\ C_{20} & C_{21} & C_{22} & C_{23} \\ C_{30} & C_{31} & C_{32} & C_{33} \end{bmatrix} \begin{bmatrix} D_1 \\ D_2 \\ D_3 \\ D_4 \end{bmatrix},$$

where the Stokes vector S is the sum of the four parameter components.

Classic polarimeters such as those described above are designed to accurately measure the time-averaged state of polarization (SOP) of the light source. When the degree of polarization (DOP) is 100%, the time-averaged polarization will be seen as the instantaneous polarization. For instance, when a signal has a sufficiently narrow linewidth, the time-averaged SOP will be the same as the instantaneous SOP. In most cases, however, optical signals will exhibit a finite bandwidth that extends over a range such that the polarization of the signals varies over their spectral bandwidth. Therefore, at any point in time, the "actual" (instantaneous) SOP may differ from the measured average value. Equivalently, their polarization can vary in time at a rate that is too great for conventional detectors to track. In this case, the DOP will be less than 100%. It has been found that if the original optical signal has a sufficiently large bandwidth, it is possible that the value of the Stokes vector S will vary across the spectrum of the optical signal. In this case, the DOP as measured from the SOP may be less than unity at any given time.

FIG. 1 is a Poincare sphere representation of the average Stokes vector S, showing a variation that may exist across the spectrum, where this variation is also referred to as a spectral "string" s of polarization states or, simply, "SOP string". The set of polarizations forming the SOP string s may also be referred to as the SOP of the signal, in contrast to the "average SOP". The bold arrow representation of the average Stokes vector S is the frequency/time-averaged vector measured by a standard polarimeter. A measurement of the Stokes vector for an exemplary single frequency component ω is represented as $S_\omega$ in FIG. 1. It is to be noted that a corresponding string s that varies as a function of time (instead of frequency) may also be depicted for a time domain representation of the Stokes vector, which is derived from a Fourier transformation of the spectral data into temporal data.

While a conventional polarimeter can measure the average state of polarization, it cannot measure rotations of the SOP string about the time average SOP. If the polarization state of the propagating optical signal changes as a function of time, it is possible for the averaged Stokes vector S to remain fixed (measured, for example, by using rotating half-waveplates and quarter-waveplates), while the underlying spectral string rotates about this average value. FIG. 2 is a Poincare sphere representation of this time-dependent characteristic, illustrating the rotation of the exemplary string s through an angle α on the sphere to position s', while the Stokes vector S remains constant (the shape of the spectral string also remains fixed for the case of FIG. 2).

In the case of either a relatively large bandwidth or large time-dependent changes in polarization (or both), information about the rotation of the spectral (and/or temporal) SOP string with respect to the average SOP will not be recognized by a conventional polarimeter, rendering the measurements incomplete. It would be desirable to add a functionality to a polarimeter so as to make it sensitive to the polarization transformations that cause the SOP string to rotate about the average SOP value.

Prior art spectral polarimeters have been developed to provide a measurement of the Stokes vector as a function of wavelength for wideband applications. In these arrangements, wavelength filtering (or the use of polarization sensitive elements with sufficient wavelength dispersion) is required to be used so that the polarization properties may be recorded as a function of wavelength. However, such measurements require complex dispersive elements, movable polarization elements, large detector arrays and/or slowly scanning filters, all of which make the resulting device large, slow, costly and complicated. Moreover, such spectral polarimeters are not necessary to provide information with respect to rotations of the SOP about the average SOP. A need remains, therefore, for a more efficient and compact, as well as higher speed, arrangement to provide information regarding the rotation of the SOP string with respect to average SOP.

SUMMARY OF THE INVENTION

The needs remaining in the prior art are addressed by the present invention, which relates to an optical polarimeter and, more particularly, to a polarimeter that utilizes additional Stokes parameter measurements to determine both an average Stokes vector as well as any rotation of the state of polarization around the average Stokes vector value.

In accordance with the present invention, an optical polarimeter is formed that measures the SOP under multiple, different conditions that yield both the conventional average Stokes vector and at least one condition-dependent Stokes vector, allowing for any wavelength-dependent and/or time-dependent variations in the polarization state of a propagating optical signal with respect to the average Stokes vector value to be observed.

In one embodiment, a conventional in-line, fiber-based optical polarimeter is enhanced to include a second Stokes measurement arrangement, in one case, a spectral filter used in combination with conventional grating and detector pairs, to create a "condition-dependent" Stokes vector—the "condition" in this case being the filter characteristics. The inclusion of a second Stokes measurement arrangement provides a separate set of measurements for the propagating optical signal that yields a wavelength-dependent view of the Stokes vector (i.e., the spectral "string"). Additionally, if the measurements are made over time, information about changes in the spectral string as a function of time can be calculated and used to define the state of polarization of the propagating signal, as well as a time-dependent function.

In another embodiment, a plurality of different filters is utilized, each having a different set of characteristics and thus yielding a different set of measurements. The filters themselves may take any desired form and, in fact, electrical filtering may be used to filter the photodetector output signals prior to calculating the Stokes vectors. Yet another embodiment of the present invention utilizes a single detector/filter pair as the second Stokes measurement arrangement. Thus, broadly speaking, a single measurement may be used to create the second Stokes vector measurement, as long as the single measurement is not parallel to the average Stokes vector measured by the first Stokes measurement arrangement (which would therefore not contain any additional information).

While the polarimeter examples presented in this specification describe the utilization of fiber-based gratings to form an in-line polarimeter, it is to be understood that other types of polarimeter arrangements may be used. These arrangements include, but are not limited to, rotating waveplate polarimeters and division-of-amplitude polarimeters.

The second Stokes vector measurement arrangement of the inventive polarimeter may be disposed in a separate portion of the optical signal path with respect to the first Stokes vector measurement arrangement (i.e., the conventional polarimeter portion), or disposed at same axial location along the signal as the conventional polarimeter, but spatially separated therefrom (i.e., in a fiber-based polarimeter, the second arrangement is azimuthally separated from the first arrangement).

While preferred embodiments comprise an in-line, all-fiber polarimeter, it is possible to form the optical polarimeter of the present invention from discrete elements, if desired.

A specific embodiment of the present invention may be defined as an optical polarimeter for identifying polarization transformations in a propagating optical signal, including a first Stokes measurement arrangement for creating an average Stokes vector S defining a state of polarization of an optical signal propagating along an optical signal path and a second Stokes measurement arrangement including at least one filtering element, the second Stokes measurement arrangement configured to create a second Stokes component (which may be a scalar or vector quantity) that is modified by the presence of the at least one filtering element such that the second Stokes component is a subset of the average Stokes vector S, wherein the combination of the average Stokes vector S and the second Stokes vector S' provides information regarding polarization transformations in the propagating optical signal.

Another specific embodiment of the present invention may be defined as a method of measuring polarization transformation of an optical signal comprising the steps of: (1) passing a portion of the optical signal through a first Stokes vector measurement arrangement to measure an average Stokes vector S defining a state of polarization of a propagating optical signal; (2) passing a portion of the optical signal through a second Stokes measurement arrangement including at least one filtering element, the second arrangement providing a second measured Stokes component that is a subset of the average Stokes vector and (3) providing information regarding changes of the averaged Stokes vector S with respect to wavelength and time.

Other and further embodiments and aspects of the present invention will become apparent during the course of the following discussion and by reference to the accompanying drawings.

BRIEF DESCRIPTION OF THE DRAWINGS

Referring now to the drawings,

FIG. 4 is an exemplary optical polarimeter formed in accordance with the present invention, using an optical filter to create a second Stokes vector S';

DETAILED DESCRIPTION

Figure 2:
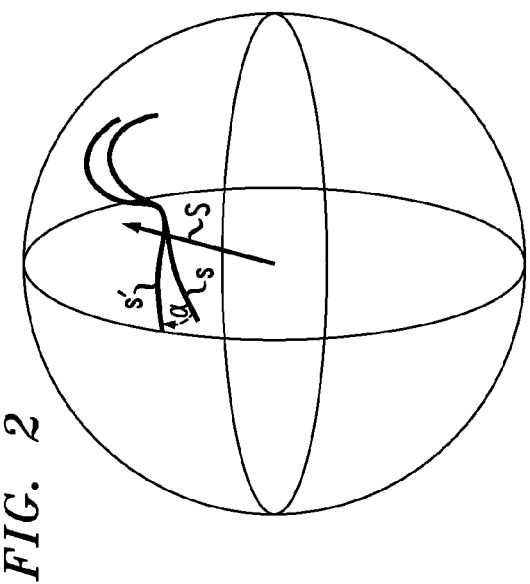
FIG. 2 is a representation similar to that of FIG. 1, in this case illustrating the rotation of the spectral string about the (fixed) averaged Stokes vector, where this rotation can occur as a function of time.
Figure 3:
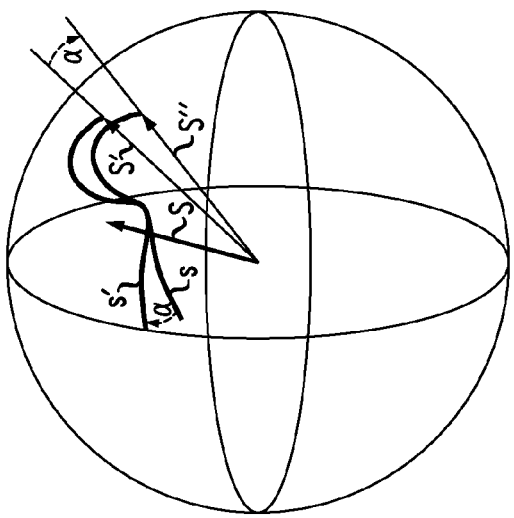
FIG. 3 is a Poincare sphere representation of the aspects of the present invention associated with creating at least one additional Stokes vector S', created using a subset of conditions, the representation illustrating the additional information associated with utilizing at least one additional Stokes vector S'.
Figure 1:
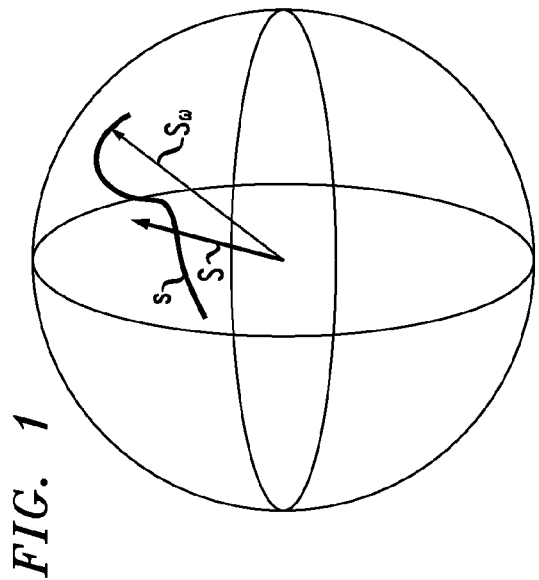
FIG. 1 is a Poincare sphere, showing a three-dimensional representation of an averaged Stokes vector, as well as a single Stokes vector measured at a particular frequency, and the associated spectral string, illustrating the movement in the Stokes vector over the associated spectrum.

As mentioned above, the present invention involves measuring the state of polarization (SOP) under multiple, different conditions so as to produce additional Stokes vectors that supplement the conventional average Stokes vector measured by a traditional optical polarimeter. FIG. 3 illustrates the premise of the present invention in a Poincare sphere representation. As before, the average Stokes vector S and the spectral string s are shown. In accordance with the present invention, a second Stokes vector S' is measured, perhaps using a filtered subset of wavelengths, the use of a thinner line for S' being indicative of its subset nature. Since the second measurement is a subset of the averaged Stokes vector S, it will change as the conditions are modified (i.e., polarization transformations are applied to the signal over time, over bandwidth, etc.). This "change" will appear as a rotation of the S' about S—in the same manner as string s rotates. Therefore, by creating this additional measurement opportunity with S' (and, perhaps, additional subsets creating additional vectors S", as shown in FIG. 3, S''', etc.), polarization transformations of the signal that rotate about the average SOP can be detected. The rotation shown by angle α in FIG. 3.

FIG. 4 illustrates an exemplary optical polarimeter 10 formed in accordance with the present invention that includes a spectral (optical) filter 12 for creating the conditions where a "subset" of the complete average Stokes vector S is created as a second Stokes vector S' in accordance with the present invention to provide measurements of the spectral string characteristics. The particular embodiment illustrated in FIG. 4 is an "all-fiber" polarimeter, with an optical signal coupled into a core region 16 of an optical fiber 14. Optical fiber 14 is selected to exhibit some degree of birefringence to ensure that polarization rotation occurs during the measurement of the average Stokes vector. It is to be understood that the polarimeter of the present invention may alternatively be formed of discrete components. Indeed, this is only one exemplary embodiment of the present invention while others will be described in detail hereinbelow.

Referring to FIG. 4, optical polarimeter 10 is shown as comprising a first Stokes measurement arrangement 20 that comprises the components found in a conventional fiber-based optical polarimeter. In particular, first Stokes measurement arrangement 20 includes a set of four gratings $22_1$-$22_4$ of specific characteristics formed within core region 16 of optical fiber 14 (e.g., each grating is linearly polarized at a different orientation with respect to the optical axis OA). As a propagating optical signal passes through gratings $22_1$-$22_4$, a portion of the beam will be out-coupled and directed into a set of associated photodetector $24_1$-$24_4$, associated with gratings 22 in a one-to-one relationship. The detector output signals $D_1$, $D_2$, $D_3$ and $D_4$ are electrical signals, used to create the average Stokes vector S by employing the 4×4 instrument matrix C in the manner described above and shown below for the sake of completeness:

$$\vec{S}(t) = \begin{bmatrix} S_0(t) \\ S_1(t) \\ S_2(t) \\ S_3(t) \end{bmatrix} = \begin{bmatrix} C_{01} & C_{02} & C_{03} & C_{04} \\ C_{11} & C_{12} & C_{13} & C_{14} \\ C_{21} & C_{22} & C_{23} & C_{24} \\ C_{31} & C_{32} & C_{33} & C_{34} \end{bmatrix} \begin{bmatrix} D_1(t) \\ D_2(t) \\ D_3(t) \\ D_4(t) \end{bmatrix} = C\vec{D}(t), \text{ where}$$

$$\langle \vec{S}(t) \rangle_{time} = C \langle \vec{D}(t) \rangle_{time}, \text{ and}$$

$$\langle D_1(t) \rangle_{time} = \int_{-\infty}^{+\infty} |E_1(t)|^2 dt = \int_{-\infty}^{+\infty} |E_1(\omega)|^2 d\omega$$

where $E_i$ is the electrical field at a given detector $24_i$. The indicated "time" averages are taken over all time, but can be generalized to a given time interval that is appropriate for the specific devices used as detectors 24.

In accordance with the present invention, optical polarimeter 10 is formed to further comprise a second Stokes measurement arrangement 30, used to measure a second Stokes component, in this case a vector S' that is created based on a subset of the information used to create the average Stokes vector. In this FIG. 4 embodiment, second Stokes measurement arrangement 30 is formed to include spectral (wavelength) filter 12, which thus removes some of the wavelength values utilized in the formation of average Stokes vector S and creates a second Stokes vector S' based upon a subset of wavelength values.

Similar to first Stokes measurement arrangement 20, second Stokes measurement arrangement 30 includes a set of gratings $32_1$-$32_4$, disposed along a portion of core region 16, which are used to out-couple portions of the propagating optical signal. In accordance with this embodiment of the present invention, the out-coupled signal portions first pass through optical filter 12 before entering a set of photodetectors $34_1$-$34_4$, thus modifying the spectral properties of the signals presented to photodetectors 34. Optical filter 12, as will be discussed in more detail below in association with FIG. 8, may take a variety of different forms, including a bandpass filter that limits the specific wavelengths that are permitted to pass through and reach detectors 34.

Figure 5:
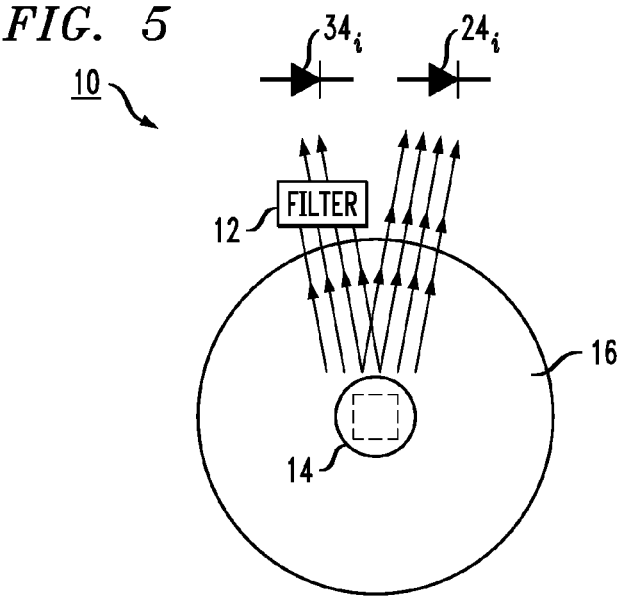
FIG. 5 is an end view of an exemplary embodiment of the present invention, showing a polarimeter having both a first and second Stokes measurement arrangements formed at the same location along the length of the optical fiber circumferentially displaced therefrom.

While the embodiment of FIG. 4 shows Stokes measurement arrangements 20 and 30 as located along separate portions of optical fiber 14 (that is, separated longitudinally along optical axis OA), is it possible that they may be located at essentially the same longitudinal position along fiber 14, and in this case spatially separated around the perimeter of the fiber (i.e., circumferentially separated). An end view of this circumferentially-separate embodiment is shown in FIG. 5.

In the case of either longitudinally-separated or circumferentially-separated Stokes measurement arrangements, the presence of optical filter 12 as part of second Stokes measurement arrangement 30 modifies the signals reaching detectors 34 (as compared to the signals reaching detectors 24). As a result, the second Stokes vector S' will be different from, and is actually a subset of, the original average Stokes vector S, where S' is defined as follows:

$$\vec{S'}(t) = \begin{bmatrix} S'_0(t) \\ S'_1(t) \\ S'_2(t) \\ S'_3(t) \end{bmatrix} = \begin{bmatrix} C_{01} & C_{02} & C_{03} & C_{04} \\ C_{11} & C_{12} & C_{13} & C_{14} \\ C_{21} & C_{22} & C_{23} & C_{24} \\ C_{31} & C_{32} & C_{33} & C_{34} \end{bmatrix} \begin{bmatrix} D'_1(t) \\ D'_2(t) \\ D'_3(t) \\ D'_4(t) \end{bmatrix} = C\vec{D'}(t), \text{ where}$$

$$\langle \vec{S'}(t) \rangle_{time} = C \langle \vec{D'}(t) \rangle_{time}, \text{ and}$$

$$\langle D'_i(t) \rangle_{time} = \int_{-\infty}^{+\infty} dt \left| \int_{-\infty}^{+\infty} \frac{d\omega}{2\pi} F(\omega) E_i(\omega) e^{i\omega t} \right|^2$$

$$= \int_{-\infty}^{+\infty} \frac{d\omega}{2\pi} |F(\omega) E_i(\omega)|^2$$

$$= \int_{-\infty}^{+\infty} dt \left| \int_{-\infty}^{+\infty} dt' F(t') E_i(t-t') \right|^2,$$

where $F(\omega)$ is the filter response. As illustrated in FIG. 3, as long as S' is not parallel to S, rotations about S can be measured by measuring changes in S'. In particular, the S' vector can be broken up into its components that are parallel to and perpendicular to S. The component that is perpendicular to S will give the rotation of the SOP about S.

While the embodiment shown in FIG. 4 utilizes a set of four detectors in second Stokes measurement arrangement 30, it is to be understood that additional detectors beyond this set of four may be added to improve the accuracy of the measurement (in general, additional detectors may be added to either arrangement 20 or 30).

Figure 6:
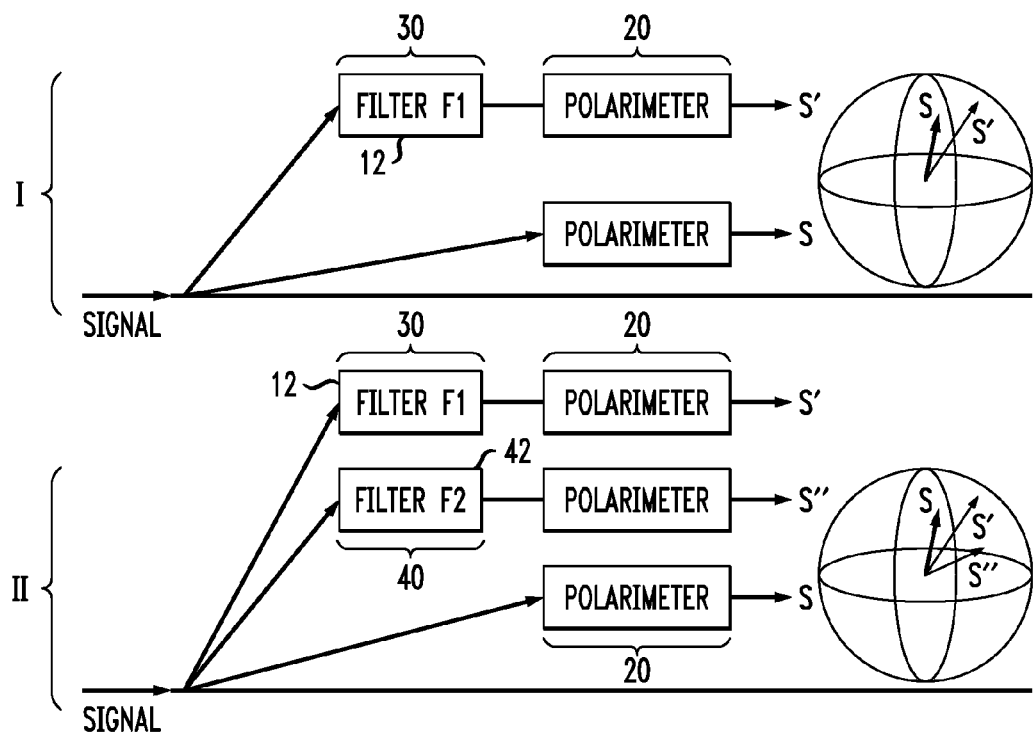
FIG. 6 is a high level diagram depicting an alternative embodiment of the present invention, utilizing two separate filters for forming two different Stokes vectors S' and S", for use in analysis with the averaged Stokes vector S.

Additional measurements may be also be created by adding a second filter to the configuration, as shown in high level form in the diagram of FIG. 6, thus creating a second "subset" of measurements that may be used to observe rotations of the SOP with respect to the average Stokes vector. Upper section I of FIG. 6 is equivalent to the embodiment of the present invention as shown in FIG. 4, and also illustrates the relative positions of average Stokes vector S and second Stokes vector S' (i.e., the "filtered" version, created from a subset of wavelength values). As discussed above, second Stokes vector S' will rotate about average Stokes vector S over time, as different wavelengths are impacted by changes in the instantaneous polarization state of a propagating optical signal (this rotation being "lost" in the creation of the conventional average Stokes vector).

Lower section II of FIG. 6 depicts an embodiment of the present invention where a third Stokes measurement arrangement 40 is added to the above-described configuration and includes a second optical filter 42 (having different characteristics than optical filter 12). By virtue of using different filtering, a different subset of wavelengths will be involved in the measurements, creating a different Stokes vector S". The Poincare sphere associated with lower section II illustrates this embodiment, shown the location of both S' and S" with respect to average Stokes vector S (where both S' and S" are shown as "thinner" vectors, since they are based on a subset of values). Inasmuch as both S' and S" were produced by filtering, both will be frequency-dependent. Therefore, the combination of S, S' and S" can be used to approximate the complete spectral string s underlying the time-averaged Stokes vector S.

While the embodiments of the present invention as described thus far have used a complete set of gratings and detectors in the creation of the second Stokes vector, it is to be understood that fewer grating/detector pairs may also be used and, indeed, an exemplary second Stokes measurement arrangement formed in accordance with the present invention may be used on the utilization of only a single (filtered) measurement (as provided by a single grating/detector pair, for example).

Figure 7:
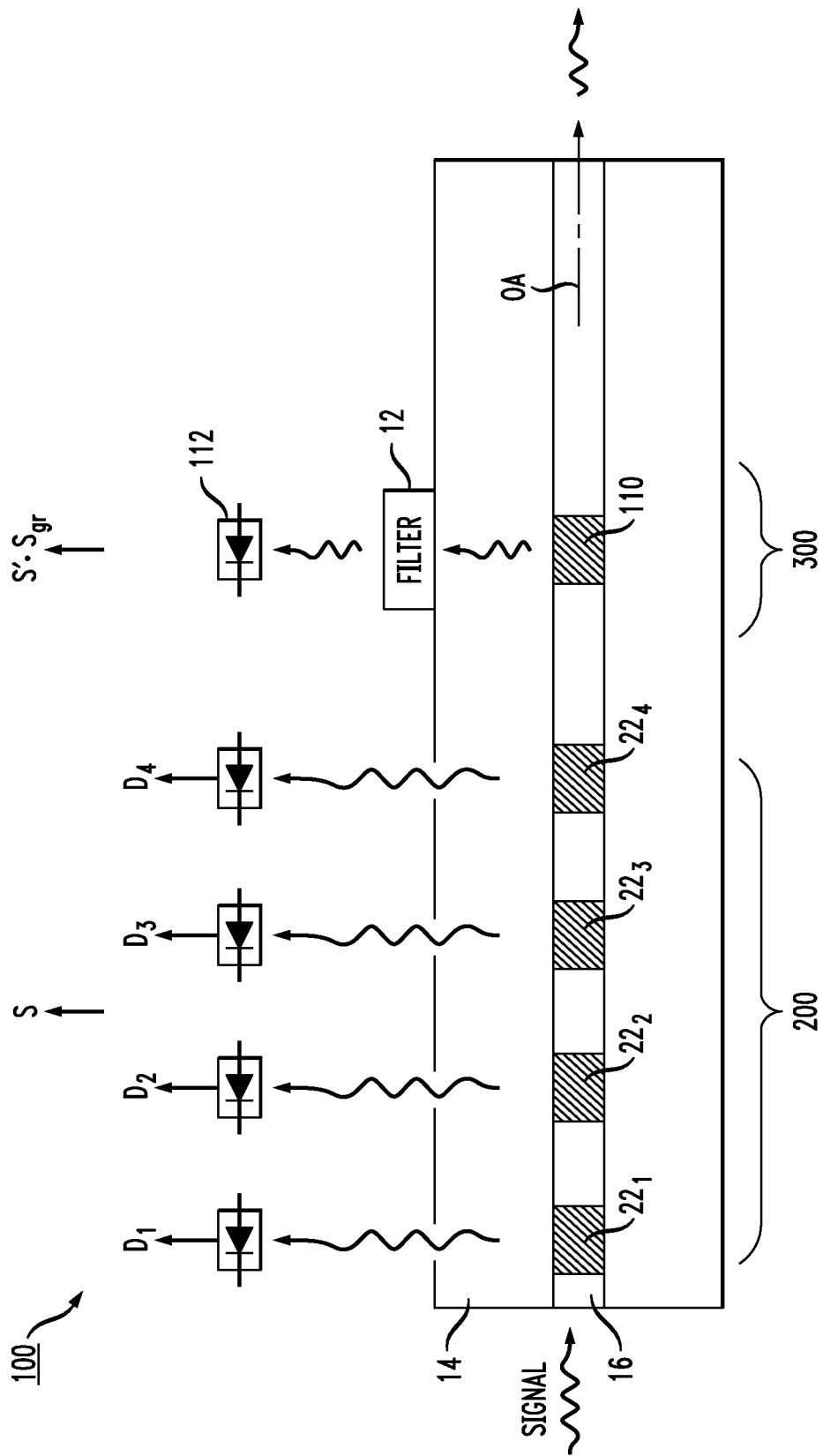
FIG. 7 illustrates another embodiment of the present invention, in this case using only a single grating and associated photodetector as a second Stokes measurement arrangement.

FIG. 7 illustrates an exemplary optical polarimeter 100 formed in accordance with this "single measurement" embodiment of the present invention. As shown, optical polarimeter 100 includes a first Stokes measurement arrangement 200 that is similar to arrangement 20 described above. In the configuration of polarimeter 100, however, a second Stokes measurement arrangement 300 is shown as comprising only a single grating 110, which is used out-couple a portion of the propagating optical signal and direct it through filter 12 into a photodetector 112. In this embodiment, photodetector 112 will measure the projection of S' onto the polarization state associated with grating 110, this projection denoted as the scalar value $S_{gr}$. As long as S' has some component along $S_{gr}$ (i.e., S' is not parallel to $S_{gr}$), the single-detector embodiment of the present invention will provide some information regarding polarization rotations about S (as long as S' does not align with the measured polarization).

This can be understood since the inverse of the calibration matrix C has row elements that are simply the measurement polarizations, $S^i$, the Stokes vector used in the projection for detector $D_i$. In this case, therefore, the detector value $D_i$ is simply the dot product of a measurement polarization with the input Stokes vector S:

$$D_i = \sum_j C^{-1} \bigg|_{ij} S_j = \sum_j S_j^i S_j$$

$$D'_i = \sum_j C^{-1} \bigg|_{ij} S'_j = \sum_j S_j^i S'_j.$$

It can be shown that rotations about S will create a variation in even one detector output signal $D'_i$. Therefore, the single detector arrangement of FIG. 7 is a suitable embodiment to address this situation. For example, consider without loss of generality, the following parameters: $S=\hat{3}$ on the Poincare sphere, with $R_s$ a rotation by angle $\alpha$ around the fixed Stokes vector S, and S' defined as the Stokes vector associated with the arrangement as shown in FIG. 7:

$$S = \begin{bmatrix} 1 \\ 0 \\ 0 \\ S_3 \end{bmatrix}, \quad S' = \begin{bmatrix} 1 \\ S'_1 \\ S'_2 \\ S'_3 \end{bmatrix}, \text{ and}$$

$$R_S = \begin{bmatrix} 1 & 0 & 0 & 0 \\ 0 & \cos(\alpha) & \sin(\alpha) & 0 \\ 0 & -\sin(\alpha) & \cos(\alpha) & 0 \\ 0 & 0 & 0 & 0 \end{bmatrix}.$$

In the conventional optical polarimeter of the prior art, it was not possible to measure $\alpha$, the rotation of the spectral string s associated with the Stokes vector S. However, inasmuch as $D'_i$ is sensitive to this rotation, a measurement can be found in accordance with the teachings of the present invention. That is:

$$D'_i = [S^i_0 \ S^i_1 \ S^i_2 \ S^i_3] \begin{bmatrix} 1 & 0 & 0 & 0 \\ 0 & \cos(\alpha) & \sin(\alpha) & 0 \\ 0 & -\sin(\alpha) & \cos(\alpha) & 0 \\ 0 & 0 & 0 & 1 \end{bmatrix} \begin{bmatrix} 1 \\ S'_1 \\ S'_2 \\ S'_3 \end{bmatrix}$$

$$= [S^i_0 \ S^i_1 \ S^i_2 \ S^i_3] \begin{bmatrix} 1 \\ \cos(\alpha)S'_1 + \sin(\alpha)S'_2 \\ -\sin(\alpha)S'_1 + \cos(\alpha)S'_2 \\ S'_3 \end{bmatrix}$$

$$= 1 + S^i_1 \cos(\alpha)S'_1 - S^i_2 \sin(\alpha)S'_1 + S^i_3 S'_3$$

Assume without loss of generality: $S'_2 = 0$ and $S^i_0 = 1$

Thus, $D'_i$ will depend on rotations about the average Stokes vector S, even if only a single detector is used in the creation of S', as shown in FIG. 7. Moreover, with sufficient calibration of the detectors and polarization optics, this single-detector embodiment can be used to estimate α from a time series of such data. Of course, if $S_1^i = S_2^i = 0$, there will be no variation and a single detector will be insufficient in providing enough data to measure α. Obviously, increasing the number of detectors overcomes this problem.

It is important to understand that there is no constraint on the shape of the optical filter used to form the additional Stokes vector(s) in the polarimeter of the present invention. For example, the filter may be periodic, quasiperiodic, static, or even vary arbitrarily in value as a function of frequency, ω. In one special case, it may be a periodic filter such as a Fabry-Perot filter with a predetermined Free Spectral Range (FSR) and finesse value, where FSR is defined as the spacing in optical frequency (or wavelength) between two successive reflected or transmitted signals and the finesse is defined as the FSR divided by the FWHM bandwidth. In this case, if the signal is of the order of one FSR, then it can be expected that the detector will see primarily one frequency component and, therefore S' will be the Stokes vector at that component. In reality, this value will depend on the finesse of the filter but will, in general, not be the same Stokes vector as the frequency (or time) averaged Stokes vector S.

An important example of an appropriate use of such a periodic filter is a WDM system where the propagating optical signals are separated by a known channel spacing. In this case, if the FSR is set to the known channel spacing, then F(ω) measures the Stokes vector at a given point within the channel bandwidth. The optical polarimeter in this embodiment therefore operates as an advanced "colorless" (i.e., wavelength-independent) polarimeter with the ability to measure the string rotation angle.

Figure 8:
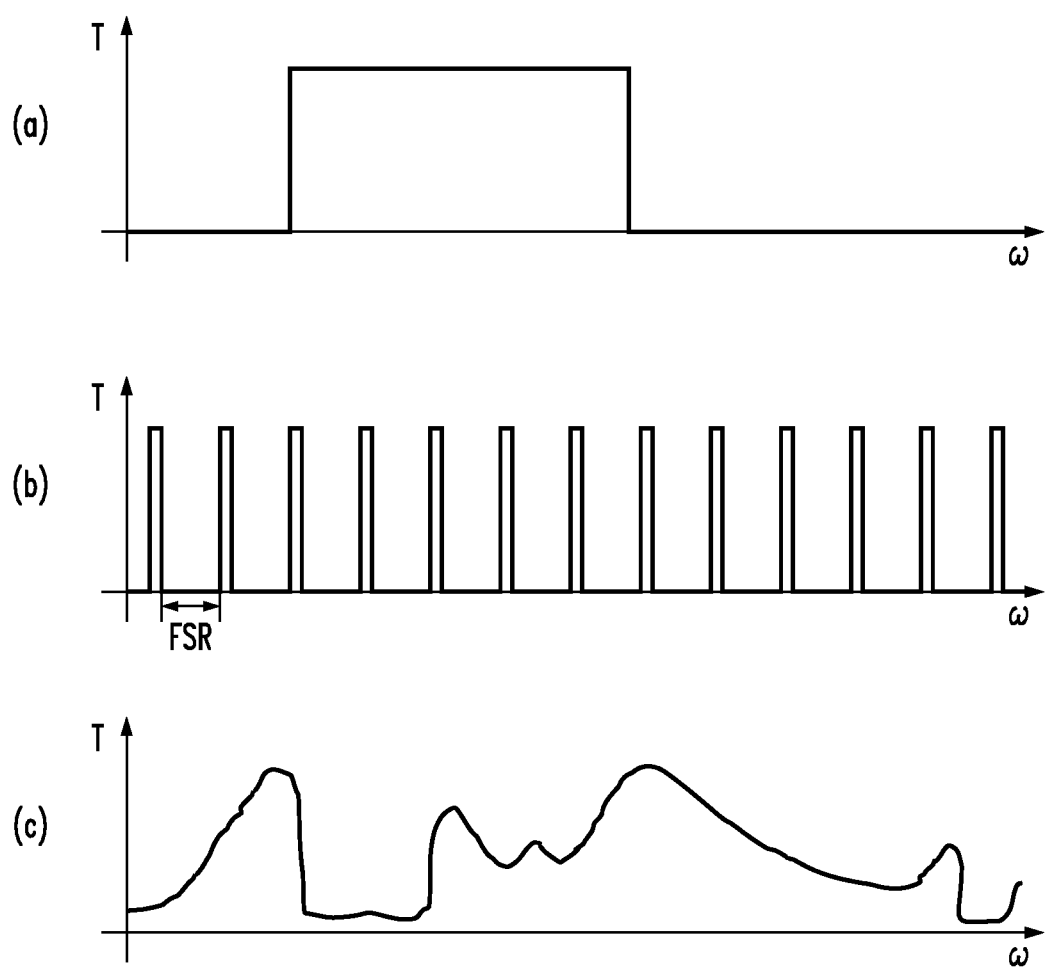
FIGS. 8(a)-(c) illustrate a set of three different filter characteristics useful in the second Stokes measurement arrangement, in accordance with embodiments of the present invention.

FIG. 8 illustrates a variety of other filter forms that may be used in the polarimeter of the present invention. FIG. 8(a) shows a bandpass filter with a step edge falling within the bandwidth of the propagating optical signal. FIG. 8(b) illustrates a periodic filter with a predetermined FSR, and FIG. 8(c) illustrates an arbitrary filter shape. In general, the optical filter used in the polarimeter of the present invention may comprise a thin film etalon, an arrayed waveguide (AWG) splitter, a fiber Bragg grating, a long period grating, a bulk grating, a thin film filter, or the like.

In yet another aspect of the present invention, it is also considered beneficial if the filter can be tuned so as to maximize the difference between S and S'. This tuning ensures that the spectrum of the signal overlaps with the filter. Moreover, if it appears that S' is very close to the average Stokes vector S, the ability to tune the filter to move S' away from S is useful. The tuning may be accomplished by shifting its wavelength, modifying its bandwidth, or a combination of these parameters. As long as the filter is stable after the tuning is completed, a proper measurement can be made.

Figure 9:
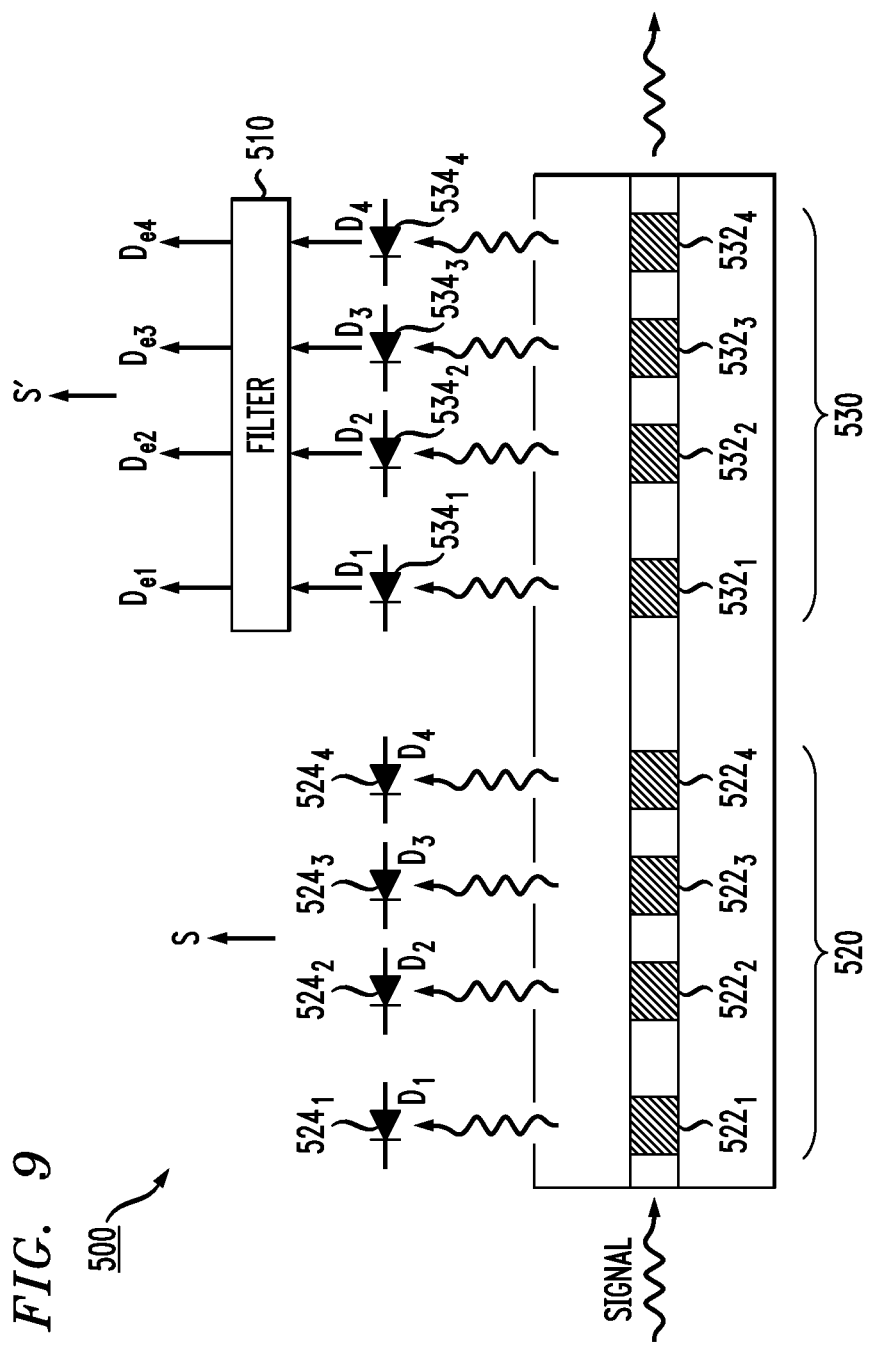
FIG. 9 shows yet another embodiment of the present invention, in this case utilizing an electrical filter to form a second Stokes vector S'.

As previously mentioned, it is possible to replace the use of optical filtering with electrical filtering in the configuration of the second Stokes measurement arrangement. In this case, filtering of the electrical output signals (D) from the detectors is used to create additional Stokes vectors S', S'', etc., for use providing additional information about the spectral string and rotation (if any) associated with the original average Stokes vector S. FIG. 9 illustrates an exemplary optical polarimeter 500 of the present invention utilizing electrical filtering to create a second Stokes vector S'. As shown, a first Stokes measurement arrangement 520 of polarimeter 500 remains the same as the "first" Stokes measurement arrangements described above and used to create the average Stokes vector S. Referring to FIG. 9, first Stokes measurement arrangement 520 is shown as comprising a set of four gratings 522 that are used in combination with a set of four detectors 524 to measure the average Stokes vector S.

In this particular embodiment, a second Stokes measurement arrangement 530 comprises a set of four gratings 532, with the various scattered signals out-coupled by gratings 532 directly applied as inputs to an associated set of four photodetectors 534. As long as gratings 532 are oriented in the same manner as gratings 522, the optical signals received by photodetectors 534 will be essentially the same received by photodetectors 532 and used to create the average Stokes vector S.

In accordance with this embodiment of the present invention, a "subset" of the average Stokes vector is created within second Stokes measurement arrangement 530 by utilizing an electrical filter 510. As shown in FIG. 9, electrical filter 510 is positioned at the output of detectors to electrically filter signals $D_1$-$D_4$ and create a set of unique electrical output signals $D_{e1}$, $D_{e2}$, $D_{e3}$, $D_{e4}$. Using the same calibration matrix C as before, a unique, filtered Stokes vector S' will be formed and used to provide the additional string/rotation information as above. Electrical filter 510 (or multiple electrical filters) may be configured in a variety of forms to create the subset of signals used to generate second Stokes vector S', where filter 510 may comprise a low pass filter, bandpass filter, etc. The filters may be "fixed" in terms of their characteristics, or tunable in the manner as described above to provide the desired separation between the average Stokes vector S and second Stokes vector S'. Indeed, it is contemplated that one embodiment of the present invention may utilize a combination of both optical and electrical filtering to create the additional Stokes vector measurements.

Figure 10:
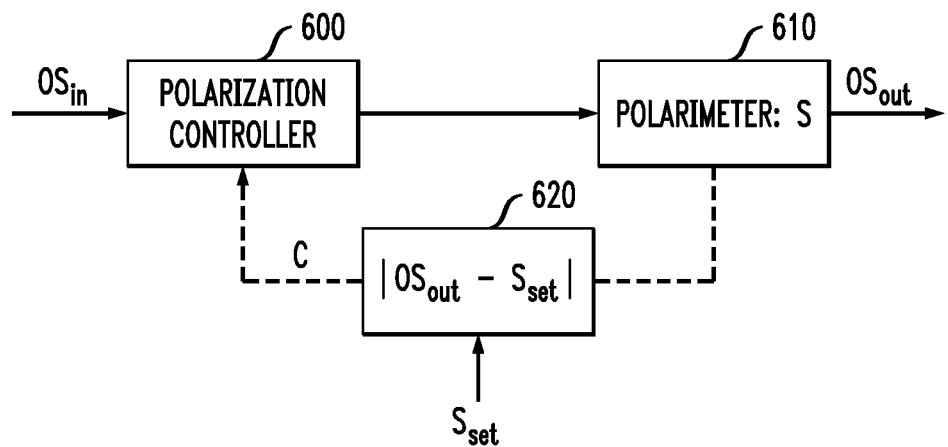
FIG. 10 shows a prior art polarization controller arrangement.

It is also contemplated that a polarimeter formed in accordance with the present invention may be utilized to construct an automatic polarization controller with improved performance over prior art automatic polarization controllers. FIG. 10 shows a prior art polarization control loop arrangement. An input optical signal with varying polarization, denoted $OS_{in}$, is sent through a polarization controller 600 (e.g., fiber squeezers, or $LiNbO_3$) and then applied as an input to a polarimeter 610 that measures that state of polarization of the output optical signal, $OS_{out}$. A portion of output optical signal $OS_{out}$ is tapped off and applied as an input to a feedback element 620, where feedback element 620 also has as an input a signal $S_{set}$, which is defined as the polarization "setpoint" of the polarization control loop. Feedback element may be a computer-controlled element. An electrical control signal C is then generated by determining the difference $|S_{out}-S_{set}|$ and applied as an input to polarization controller 600. Ultimately, when $S_{out}=S_{set}$, control signal C will have a value of zero, and no further modifications to the polarization controller will be required.

Figure 11:
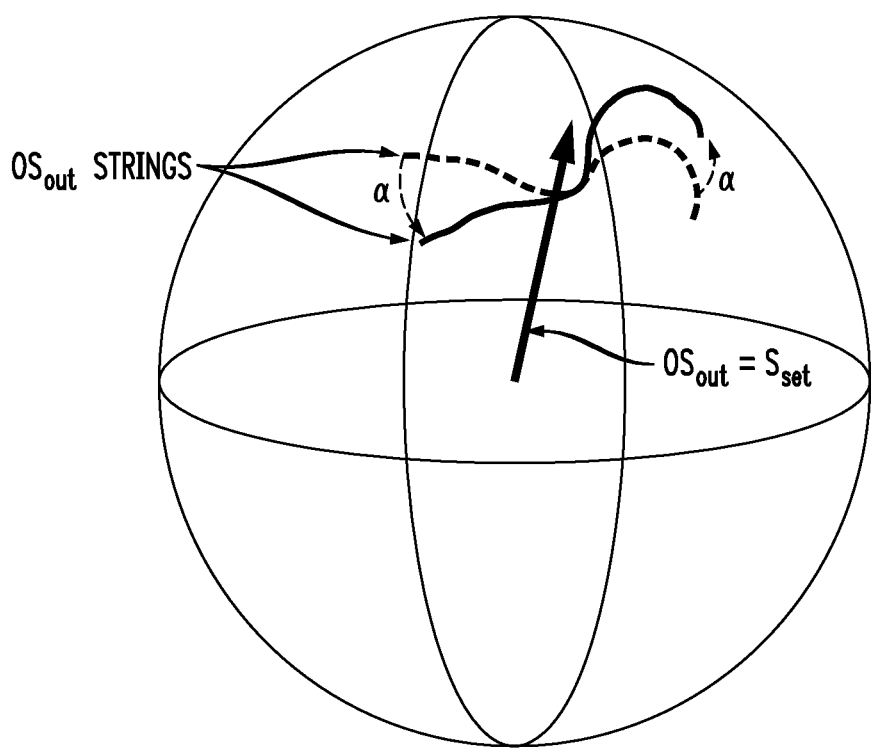
FIG. 11 is a Poincare sphere representation of the output Stokes vector associated with the prior art arrangement of FIG. 10.

FIG. 11 illustrates the output Stokes vector for the arrangement of FIG. 10 when the loop has stabilized so that $S_{out}=S_{set}$. As discussed above, if the polarization string $S_{out}$ rotates about $S_{set}$ (without any other changes in polarization state), the error signal will not change. That is, the value of $S_{out}$ will be fixed and these rotations of the polarization string may freely occur even when the loop has stabilized.

Figure 12:
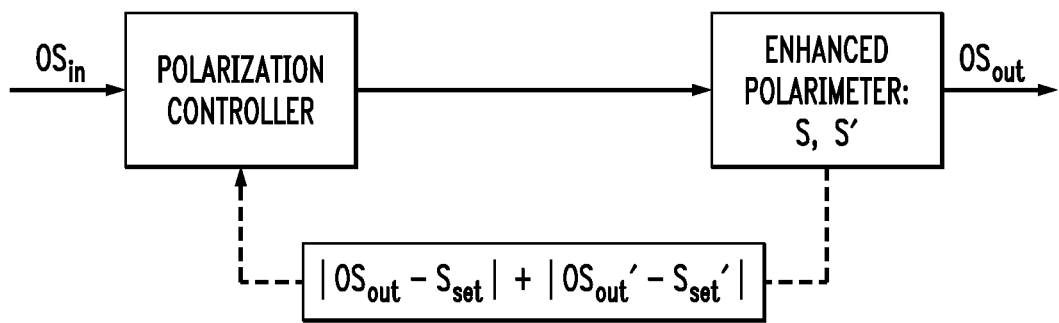
FIG. 12 is a diagram of a polarization controller arrangement formed in accordance with the present invention, where the polarimeter performs two separate measurements and the feedback path uses these two measurements to create the control signal for the polarization controller.
Figure 13:
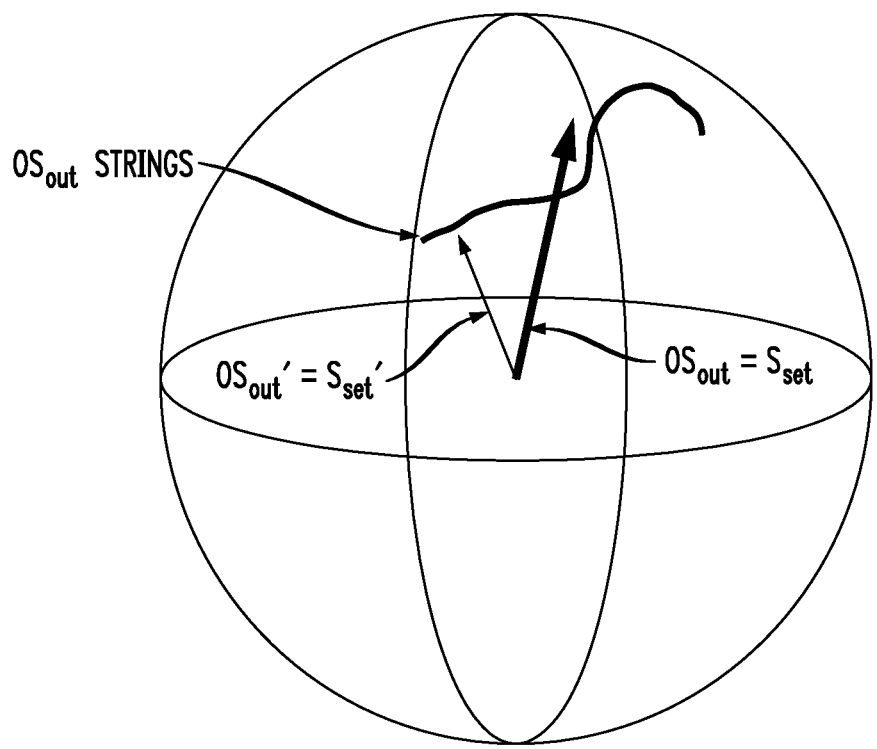
FIG. 13 is a Poincare sphere representation of the arrangement of FIG. 12.

FIG. 12 shows an improved polarization control loop using the disclosed polarimeter of the present invention. In this embodiment a feedback signal is created that includes the additional measurement S', which is sensitive to rotations about S. The control loop includes a conventional polarization controller 700, similar to controller 600 of the prior art arrangement shown in FIG. 10, with an input optical signal $OS_{in}$ with a varying polarization state applied as an input to polarization controller 700. The output from polarization controller 700 is then passed through a polarimeter 710 formed in accordance with the present invention that performs two separate measurements: S and S'. The additional measurement S' allows for an error signal to be generated that prevents rotation of the polarization string $OS_{out}$ about $S_{set}$. In particular, the control signal C is defined as the quantity $|S_{out}-S_{set}|+|S_{out}'-S_{set}'|$. Thus, when the feedback loop is stabilized not only will the Stokes vector be stabilized, but any rotation about the Stokes vector will also be stabilized. The stabilized output of this feedback loop is shown in FIG. 13. It is to be understood that the value of $S_{set}$ may be fixed, or may be varied as a function of time, depending on the application.

Note that this is just an example of a feedback loop. Different error signals, polarization controllers and electronic configurations may be possible. The measurement S' may not be a full polarization measurement as described above. For instance, if there are only one or perhaps two additional detectors, then the enhanced feedback loop of FIG. 12 can be of similar speed and complexity to prior art automatic polarization controllers. Feed-forward configurations may also be possible. The intent of this example is to show an enhanced control loop using a multiple measurement polarimeter formed in accordance with the present invention.

Indeed, many other alternatives, modifications, and variations of a polarimeter that uses rotations of states of polarization will be apparent to those skilled in the art in light of the above teachings. Of course, those skilled in the art readily recognize that there are numerous applications of the invention beyond those described herein. While the present invention has been described with reference to one or more particular embodiments, those skilled in the art recognize that many changes may be made thereto without departing from the spirit and scope of the present invention. It is therefore to be understood that within the scope of the appended claims and their equivalents, the invention may be practiced otherwise than as specifically described herein.

What is claimed is:

1. An optical polarimeter for identifying polarization transformations in a propagating optical signal, the optical polarimeter comprising
    a first Stokes measurement arrangement configured to create, as a first Stokes component, an average Stokes vector S defining a state of polarization of an optical signal propagating along an optical signal path; and
    a second Stokes measurement arrangement including at least one filtering element, the second Stokes measurement arrangement configured to create a second Stokes component that is modified by the presence of the at least one filtering element such that the second Stokes component is a subset of the average Stokes vector S, wherein the combination of the average Stokes vector S and the second Stokes component provides information regarding polarization transformations in the propagating optical signal.

2. An optical polarimeter as defined in claim 1 wherein the second Stokes measurement arrangement comprises a single filtering element and creates a second Stokes component in the form of a scalar Stokes component $S_{gr}$.

3. An optical polarimeter as defined in claim 1 wherein the second Stokes measurement arrangement comprises more than one filtering element and creates a second Stokes component in the form of a second Stokes vector S'.

4. An optical polarimeter as defined in claim 1 wherein the first Stokes measurement arrangement comprises
    an out-coupling arrangement for re-directing a plurality of optical signal portions exhibiting different signal path orientations with respect to an optical axis of the propagating optical signal, the re-directing in a direction normal to the optical axis; and
    a plurality of opto-electronic devices converting the plurality of optical signal portions into electrical representations thereof to create the average Stokes vector S.

5. An optical polarimeter as defined in claim 4 wherein the out-coupling arrangement comprises a plurality of gratings disposed at different orientations with respect to the optical axis.

6. An optical polarimeter as defined in claim 1 wherein the second Stokes measurement arrangement comprises
    an out-coupling arrangement for re-directing at least one portion of the propagating optical signal in a direction normal to the optical axis; and
    at least one opto-electronic device for converting the at least one portion of the propagating optical signal into an electrical equivalent.

7. An optical polarimeter as defined in claim 6 wherein the out-coupling arrangement comprises a single grating for creating the second Stokes component $S_{gr}$.

8. An optical polarimeter as defined in claim 6 wherein the out-coupling arrangement comprises a pair of gratings and a pair of photodetectors for creating the second Stokes component S'.

9. An optical polarimeter as defined in claim 1 wherein the at least one filtering element comprises at least one optical filter.

10. An optical polarimeter as defined in claim 9 wherein the at least one optical filter comprises a plurality of optical filters, each exhibiting different filtering characteristics.

11. An optical polarimeter as defined in claim 9 wherein the at least one optical filter is selected from the group consisting of: a thin film etalon, an arrayed waveguide (AWG) splitter, a fiber Bragg grating, a long period grating, a bulk grating and a thin film filter.

12. An optical polarimeter as defined in claim 9 wherein the at least one optical filter is a periodic filter as a function of wavelength.

13. An optical polarimeter as defined in claim 9 wherein the at least one optical filter is tunable as a function of wavelength.

14. An optical polarimeter as defined in claim 1 wherein the at least one filtering element comprises at least one electrical filter.

15. An optical polarimeter as defined in claim 14 wherein the at least one electrical filter comprises a plurality of electrical filters, each filter exhibiting different characteristics.

16. An optical polarimeter as defined in claim 14 wherein the at least one electrical filter comprises a single electrical filter.

17. An optical polarimeter as defined in claim 1 formed along an optical fiber having a core region and exhibiting sufficient birefringence to ensure polarization rotation of the optical signal propagating in a longitudinal direction along the core region.

18. An optical polarimeter as defined in claim 17 wherein the first Stokes measurement arrangement and the second Stokes measurement arrangement are disposed at separate locations along an optical axis of the optical fiber.

19. An optical polarimeter as defined in claim 17 wherein the first Stokes measurement arrangement and the second Stokes measurement arrangement are disposed at separate axial locations around a circumference of the optical fiber.

20. A method of measuring polarization transformation of a propagating optical signal comprising the steps of:
    passing a portion of the optical signal through a first Stokes measurement arrangement to measure an average Stokes vector S defining a state of polarization of a propagating optical signal; and
    passing a portion of the optical signal through a second Stokes measurement arrangement including at least one filtering element to measure a second Stokes component that is a subset of the average Stokes vector S.

21. The method as defined in claim 20 wherein the method further comprises the step of:
    analyzing the second Stokes measurement to provide information regarding polarization transformations of the propagating optical signal that leave the average Stokes vector S unchanged.

22. The method as defined in claim 20 wherein the second Stokes measurement arrangement includes a single filtering element and measures a scalar Stokes quantity $S_{gr}$.

23. The method as defined in claim 20 wherein the second Stokes measurement arrangement includes a plurality of filtering elements and measures a plurality of second Stokes vectors S'.

24. The method as defined in claim 20 wherein the second Stokes measurement arrangement includes at least one optical filtering element.

25. The method as defined in claim 20 wherein the second Stokes measurement arrangement includes at least one electrical filtering element.

26. The method as defined in claim 20 wherein the at least one filtering element is tunable over an extended bandwidth.

27. A polarization control loop comprising
    an adjustable polarization controller;
    optical polarimeter for identifying polarization transformations in a propagating optical signal, the optical polarimeter coupled to the output of the adjustable polarization controller and including
        a first Stokes measurement arrangement for creating an average Stokes vector S defining a state of polarization of an optical signal propagating along an optical signal path; and
        a second Stokes measurement arrangement including at least one filtering element, the second Stokes measurement arrangement configured to create a second Stokes component that is modified by the presence of the at least one filtering element such that the second Stokes component is a subset of the average Stokes vector S, wherein the combination of the average Stokes vector S and the second Stokes component provides information regarding polarization transformations in the propagating optical signal; and
    a feedback element responsive to the first and second Stokes measurement outputs from the optical polarimeter, the feedback element for comparing both the first and second Stokes measurements to a predetermined polarization set point values $S_{set}$ and $S_{set}'$, and providing a control signal input to the polarization controller based on the values $|S-S_{set}|$ and $|S'-S_{set}'|$.

28. A polarization control loop as defined in claim 27 where the value of setpoint $S_{set}$ is fixed as a function of time.

29. A polarization control loop as defined in claim 27 wherein the value of setpoint $S_{set}$ is adjusted as a function of time.

* * * * *